Patented June 28, 1949

2,474,213

UNITED STATES PATENT OFFICE 2,474,213

METHOD OF INCREASING THE AROMATICITY OF HYDROCARBON OIL

James F. Black, Roselle, N. J., assignor to Standard Oil Development Company, a corporation of Delaware No Drawing. Application May 22, 1946, Serial No. 671,653

7 Claims. (Cl. 260—668)

This invention generally relates to the catalytic conversion of hydrocarbon fractions produced in distilling petroleum oils and especially those of a distillable character which are vaporizable without substantial decomposition.

In a more specific sense, this invention relates to improvemnets in catalytically hydroforming and/or aromatizing hydrocarbons in the presence of an improved catalyst. In my co-pending application, Serial No. 671,654, filed May 22, 1946, of similar disclosure hereto, I have claimed methods of preparing the above catalysts and the catalyst per se.

The art of hydroforming naphthas, and aromatizing acyclic hydrocarbons performed to produce primarily gasoline of increased octane rating, is quite extensive, and it is recognized that many of the basic principles of the hydroforming and aromatization are old and that special processes have been developed which embody the principle of these methods. Both operations are carried out commercially using a catalyst. Usually the catalyst is either a group VI heavy metal oxide, carried on a suitable support such as alumina, or more recently, zinc spinel. The use of catalysts, however, in the hydroforming and aromatizing operations is the same as in other fields; namely, there is much to be learned about them. A large number of catalysts developed for hydroforming and aromatization, undergo a valence change during the various phases of the complete operation including the reaction itself which is carried out in a highly reducing atmosphere and a regeneration phase in which free oxygen is present during the burning of the coke formed on the catalyst during the productive phase, for the purpose of restoring the activity of the same. In the case, say, where the catalyst is molybdenum oxide carried on alumina, in the productive phase of the process, the molybdenum exists in the form of one of its lower oxides. On the other hand, during the regeneration of the catalyst using air or other oxygen containing gas, the active component of the catalyst; i. e., the molybdenum oxide in the example cited is reoxidized to its highest state of valence. Studies on the oxygen material balance by various investigations have shown that before the carbonaceous material on the fouled catalyst is burned or converted to oxides of carbon in the regeneration zone, the molybdenum oxide or other active ingredient is first oxidized. In other words, the chromium oxide, molybdenum oxide, or other heavy metal oxides have a greater affinity for oxygen than does the carbonaceous material. I do not fully subscribe to the foregoing theory but it is a fact, that as normally carried out, the hydroforming and aromatizing operations consume oxygen in the regeneration zone and hydrogen in the reaction zone. I wish to point out however that when properly operated the hydroforming and the aromatizing operations result in a net overall production of hydrogen so that while hydrogen is consumed in the reaction zone, hydrogen is also formed in the same zone and the amount of hydrogen formed is at least equal to that consumed.

The word or term "hydroforming" is generally understood to be an operation in which a normally liquid hydrocarbon oil is treated at elevated temperatures and pressures in a reaction zone in the presence of a solid catalytic material and added hydrogen for the purpose of forming aromatics from cyclic hydrocarbons, mostly by dehydrogenation with perhaps some isomerization of cyclic hydrocarbons, followed by dehydrogenation thereof. "Aromatizing" on the other hand, is the conversion of acyclic and cyclic hydrocarbons into aromatics, performed in the presence of a solid catalyst usually at atmospheric pressure or slightly elevated pressure.

The main object of the present invention is to produce a hydroforming catalyst of increased activity.

As previously indicated, zinc spinel base hydroforming and aromatizing catalysts are known. Zinc spinel has the formula $ZnO.Al_2O_3$ and this material containing molybdenum oxide as the active component forms an excellent hydroforming and aromatizing catalyst. My improvement, as previously indicated, goes to the matter of preparing the base, that is the zinc spinel base, and in brief compass I have found that the catalyst will have about twice the normal activity when prepared according to my method (which, briefly involves precipitating the $ZnO.Al_2O_3$ as a hot suspension) over the former practice when the precipitation was effected at ordinary room temperature.

I shall now set forth specific examples illustrating my invention:

Example 1

1683 cubic centimeters of a solution were prepared by dissolving 471 grams of chemically pure zinc sulfate and 28 cubic centimeters of concentrated sulfuric acid in enough water to give complete solution and diluting the mixture to a final volume of 1683 cubic centimeters (solution A).

In a separate container 400 grams of sodium aluminate (technical grade) were stirred for 10 minutes in 2000 cubic centimeters of distilled water. Four hundred cubic centimeters of kieselguhr were added to the latter solution and the mixture was filtered. 1683 cubic centimeters of filtrate were set aside (solution B).

In a third vessel 2 liters of distilled water were heated to 180° F. and stirred while the above two solutions (A and B) were slowly added simultaneously and at the same rate. A slurry was formed in the third vessel in which the temperature was 154° F. for a short time but during most of the time period during which the solutions were mixed, the temperature in the third vessel was in the approximate range of from 165 to 175° F.

The pH of the liquid after the solutions were mixed was 12. This mixture was neutralized by the addition of 7 cubic centimeters of concentrated sulfuric acid diluted 10 to 1. This slurry was filtered hot and washed in a Büchner funnel with 8 liters of cold distilled water. It was then reslurried in 6 liters of distilled water, filtered, and washed with 8 liters of water. The cake was again reslurried with distilled water plus a solution of 40.9 grams of ammonium molybdate in 250 cubic centimeters of distilled water and 25 cubic centimeters of concentrated ammonium hydroxide. It was then placed in a ball-mill and mixed for 2½ hours, thereupon it was withdrawn, dried while stirring, and pilled. It will not be necessary to described the pilling machine used for that is well known and the manner in which it is operated is also well known. The pills thus obtained were calcined for 3 hours at a temperature of 1200° F.

Example 2

In this example, I prepared a catalyst exactly the same as Example 1 above except that the solutions were mixed at room temperature and the precipitate was obtained at the same temperature.

Example 3

Then to evaluate the new catalyst as compared to the old one each was tested for its activity in effecting the aromatization of naphthas. The following test conditions were used; temperature 1000° F.; pressure, substantially atmospheric; feed rate, 1.2 volumes liquid per volume of catalyst per hour; reaction time, one hour. Two different feeds were tried, one normal heptane and the other a light East Texas virgin naphtha fraction of 200–270° F. boiling range.

I set forth below the results in tabular form.

| Example No. | 1 | 2 |
|---|---|---|
| Precipitation Temperature °F. | 170 | 75 |
| Weight of Catalyst in Unit grams | 74 | 127 |
| Volume of Catalyst in Unit cubic centimeters | 100 | 100 | n-HEPTANE FEED

| | 1 | 2 |
|---|---|---|
| Vol. Per Cent Conversion | 77 | 73 |
| Vol. Per Cent Selectivity | 54 | 53 |
| Vol. Per Cent Aromatics | 41 | 39 |
| Wt. Per Cent Gas | 16.0 | 14.2 |
| Wt. Per Cent Coke | 4.8 | 5.6 |

200–270° F.—EAST TEXAS NAPHTHA FEED

| | 1 | 2 |
|---|---|---|
| Vol. Per Cent Conversion | 79 | 77 |
| Vol. Per Cent Selectivity | 55 | 53 |
| Vol. Per Cent Aromatics (net increase) | 43 | 40 |
| Wt. Per Cent Gas | 10.0 | 10.1 |
| Wt. Per Cent Coke | 6.3 | 7.1 |

It will be noted from the foregoing data that the conversion and selectivity (amount of aromatics formed) and the weight of coke and gas formed in Examples 1 and 2 were substantially the same. The point is, however, (as above data clearly show) that in Example 1 (hot precipitation method) the catalyst weighed considerably less than the catalyst in Example 2. This means, therefore, that considerably less catalyst need be used in a given converter. It further means that the number of pounds of the active ingredient such as molybdenum oxide may be reduced which in turn means that the amount of hydrogen consumed in reducing the catalyst at the outset of a productive phase operation and, furthermore, the amount of oxygen consumed at the outset of a regeneration phase, is considerably reduced in both instances. In other words, considering first the productive phase of the operation when the catalyst first enters the reaction zone, after having been regenerated, it is probably nearly all in its highest state of oxidation or valence. Thus in the case of molybdenum oxide, the same is probably in the form $MoO_3$. In this form in the reaction zone which is a highly reducing environment, it undergoes reduction to at least $MoO_2$ and perhaps, in part at least, to metallic molybdenum. In this reduction, of course, hydrogen is consumed and also possibly part of the feed. Now it is obvious that if, in a given converter, only 50% as much molybdenum oxide is present where the catalyst is prepared according to my new method, then the consumption of hydrogen and/or hydrocarbon in reducing the molybdenum oxide is going to be only about ½ that required in the conventional converter having conventionally made catalyst of about twice the specific gravity and twice the content of molybdenum oxide.

Example 4

I made two other runs to determine the efficacy of a catalyst according to my present method on a normal heptane feed and two others on a light Texas naphtha feed. In each instance, a zinc alumina catalyst containing 10% by weight of molybdenum oxide and 90% of the weight of the base was used. The specific gravity of this catalyst was approximately 0.7.

The catalyst was prepared by essentially the same procedure as employed in Example 1, except that it was made in a 25 pound batch on a semi-commercial scale, employing commercial type equipment, including a filter press. Precipitation of the zinc aluminate was made at above 185° F.

The catalyst was evaluated by the same procedure as described in Example 3. Two of the runs (one on each feed stock) were made at a feed rate of 1.2 volumes of catalyst per volume of liquid feed per hour and in the other two runs, the feed rate was 0.6 volume of liquid feed per volume of catalyst per hour. The temperature was 1000° F. in the reaction zone and the pressure, as stated previously, was atmospheric.

| | | |
|---|---|---|
| Feed rate, v./v./hr. | 1.2 | 0.6 |
| Apparent Density of Catalyst, g/cc | 0.7 | 0.7 | n-HEPTANE FEED

| | | |
|---|---|---|
| Vol. Per Cent Conversion | 72 | 91 |
| Vol. Per Cent Selectivity | 53 | 55 |
| Vol. Per Cent Aromatics | 38 | 49 |
| Wt. Per Cent Gas | 16.3 | 21.4 |
| Wt. Per Cent Coke | 2.4 | 4.6 |

200–270° F.—EAST TEXAS NAPHTHA FEED

| | | |
|---|---|---|
| Vol. Per Cent Conversion | 68 | 93 |
| Vol. Per Cent Selectivity | 52 | 50 |
| Vol. Per Cent Aromatics (net increase) | 35 | 46 |
| Wt. Per Cent Gas | 9.3 | 18.7 |
| Wt. Per Cent Coke | 5.3 | 7.4 |

It is very striking to note the high conversion and yield of aromatics obtained at the 0.6 v./v. per hour feed rate which corresponds to the same weight per weight per hour used on previous tests where the catalyst was around 1.3 grams per cubic centimeter. This, as stated, would have the advantage in saving of catalyst in fixed beds, catalyst units, or fluid bed units, as well as effecting a reduction in the valence change during successive oxidation and reduction phases in a complete cycle of operation.

Instead of using zinc sulfate in preparing the base or carrier, I may employ other water soluble zinc salts such as the nitrate, chloride, etc.

In hydroforming a hydrocarbon fraction, substantially the same conditions may be employed as set forth above, e. g., in aromatizing the 200 to 270° F. East Texas virgin naphtha fraction, except that 2000 to 3000 cubic feet of hydrogen per barrel of oil and a pressure of from about 100 to 250 lbs. per square inch gauge pressure are employed, in which case at least the six carbon atom ring naphthenes, such as cyclohexane, will be converted to aromatics, virtually quantitatively, and certain five carbon atom ring naphthenes, such as methyl or ethyl cyclopentane, may be first isomerized to a six carbon atom ring naphthene and thereafter dehydrogenated.

To recapitulate briefly, my present invention relates to improvements in the preparation of the base, zinc aluminate, of a hydroforming catalyst; and, in brief compass, it involves precipitating the zinc aluminate base from a hot solution, that is, a solution maintained at a temperature of 150 to 200° F., preferably around 180 to 185° F. For some reason a catalyst so prepared is of greater activity than when the base is precipitated from a cold solution. I have noted that the catalyst produced by the hot precipitation method has a specific gravity or density considerably less than that prepared by the cold precipitation method and that with considerably less catalyst from the standpoint of actual weight, I may obtain with my improved catalyst, the same conversion and selectivity in hydroforming and aromatizing as previously obtained with almost twice the weight of catalyst.

Many modifications of my invention may be made by those skilled in this art without departing from the spirit thereof.

What I claim is:

1. The method of increasing the aromaticity of a petroleum naphtha which comprises contacting the said naphtha at elevated temperatures with a catalyst consisting essentially of a group VI heavy metal oxide carried on a zinc spinel base prepared by precipitating said zinc spinel from a solution containing a water soluble zinc salt and a water soluble aluminum salt, said solution being maintained at 150° to 200° F. during the precipitation.

2. The method of claim 1 in which the group VI metal oxide is molybdenum oxide.

3. The method of claim 1 in which the group VI metal oxide is chromium oxide.

4. The method of aromatizing an acyclic hydrocarbon, which comprises contacting said hydrocarbon at elevated temperatures in the presence of a hydrogen-containing gas, with a low density catalyst consisting essentially of a group VI metal oxide carried on a zinc spinel base formed by precipitating said zinc spinel from mixed aqueous solutions of a zinc salt and an aluminum salt maintained at temperatures of about 150° to 200° F.

5. The method of hydroforming a naphthenic naphtha which comprises contacting said naphtha at elevated temperatures and pressures in the presence of a hydrogen-containing gas, with a low density catalyst consisting essentially of a group VI metal oxide carried on a zinc spinel base formed by precipitating said zinc spinel from mixed aqueous solutions of a zinc salt and an aluminum salt maintained at a temperature of about 150° to 200° F.

6. The method of claim 4 in which the group VI metal oxide is molybdenum oxide.

7. The method of claim 5 in which the group VI metal oxide is molybdenum oxide.

JAMES F. BLACK.

REFERENCES CITED

The following references are of record in the file of this patent:

UNITED STATES PATENTS

| Number | Name | Date |
| --- | --- | --- |
| 1,900,859 | Connolly et al. | Mar. 7, 1933 |
| 2,088,281 | Smith | July 27, 1937 |
| 2,330,640 | Teter | Sept. 28, 1943 |
| 2,392,738 | Holder et al. | Jan. 8, 1946 |
| 2,447,016 | Kearby | Aug. 17, 1948 |